(12) United States Patent
Scherpbier

(10) Patent No.: US 6,263,365 B1
(45) Date of Patent: *Jul. 17, 2001

(54) BROWSER CONTROLLER

(75) Inventor: Andrew W. Scherpbier, San Diego, CA (US)

(73) Assignee: Raindance Communications, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,642

(22) Filed: Mar. 18, 1999

Related U.S. Application Data

(63) Continuation of application No. 08/726,377, filed on Oct. 4, 1996, now Pat. No. 5,944,791.

(51) Int. Cl.$^7$ .......................... G06F 15/16; G06F 15/177
(52) U.S. Cl. .......................... 709/218; 709/227; 709/246
(58) Field of Search .................................. 709/200, 218, 709/217, 219, 202, 203, 229, 246, 227, 209, 205; 707/10, 501, 513

(56) References Cited

U.S. PATENT DOCUMENTS

| | | | |
|---|---|---|---|
| 5,706,502 | * | 1/1998 | Foley et al. ............................. 707/10 |
| 5,754,830 | * | 5/1998 | Butts et al. ........................... 709/203 |
| 5,765,152 | * | 6/1998 | Erickson .................................. 707/9 |
| 5,778,368 | * | 7/1998 | Hogan et al. ......................... 709/203 |
| 5,781,909 | * | 7/1998 | Logan et al. ......................... 709/200 |
| 5,944,791 | * | 8/1999 | Scherpbier ........................... 709/218 |

OTHER PUBLICATIONS

McBride et al., "Using Virtual Reality for Distance Teaching a Graduate Information Systems Course", ISBN: 0–8186–7426–1, IEEE Proceedings, pp. 263–272, Jan. 1996.*

Domel, P., "Mobile Telescript Agents and The Web", ISBN: 0–8186–7414–8, IEEE Compcon '96, pp. 52–57, Feb. 1996.*

Youdon, E., "Java, the Web, and Software Development", ISBN: 0018–9162, IEEE Computer, pp. 25–30, Aug. 1996.*

McBride, James, "Contigo Launches Guided Web Tours", ZD Internet Magazine (ZDNet), Jul. 1997.*

* cited by examiner

*Primary Examiner*—Mark H. Rinehart
*Assistant Examiner*—Jason D. Cardone
(74) *Attorney, Agent, or Firm*—Brobeck, Phleger and Harrison LLP

(57) ABSTRACT

A pilot computer can control the Web browser of at least one passenger computer. The user of the passenger computer is instructed to log onto a control site, which downloads an active control, such as an applet, to the passenger computer. An active control is also provided to the pilot computer. If the pilot computer desires to present a particular Web page to both the pilot computer and the passenger computer for, e.g., discussing the page during a conference call, the pilot computer transmits the appropriate URL to the control site, which then retrieves the Web page. Next, the control site sanitizes the page by disabling its hyperlinks, and then the control site causes the passenger computer's active control to download the sanitized page. Also, the control site filters the page such that the hyperlinks are not disabled, but are rather encoded to point back to the control site, and this filtered page is downloaded to the pilot computer. The pilot computer can then "click" on a hyperlink, causing the control site to decode the hyperlink, retrieve the appropriate Web page, and instruct the passenger computer's active control to download the page after sanitizing the page.

10 Claims, 5 Drawing Sheets

FLIGHT CREATION

FLIGHT BOARDING

FLIGHT CONDUCT

FLIGHT MANAGEMENT

BROWSER CONTROLLER

RELATED APPLICATIONS

This application claims the benefit of the filing date of U.S. patent application Ser. No. 08/726,377, now U.S. Pat. No. 5,944,791, filed Oct. 4,1996.

FIELD OF THE INVENTION

The present invention relates generally to systems and methods for browsing computer networks such as the World Wide Web ("Web"), and more particularly to systems and methods for enabling a first computer to present a display of a Web page on one or more second computers.

BACKGROUND

Use of and applications for Internet-related networks, and in particular the so-called "World Wide Web" ("Web"), increases daily. The Web is a network of computer information storage sites, and each site can include one or more information displays, colloquially referred to as "pages". Essentially, a Web site presents advertising or other information regarding a particular organization. A person with a computer and a software system referred to as a "browser" can connect the computer to the Internet (and, hence, to the Web), usually via a telephone line, and with the aid of the browser, access the various Web pages.

It happens that among the many applications of the Web, for various reasons one computer user might desire to discuss a particular Web page or pages with another computer user who is remote from the first user. Accordingly, the users establish communication with each other, and then both log their computers onto the Web. Then, both must access the Web page they desire to discuss by retrieving (colloquially referred to as "downloading") all of the information on the desired Web page to their respective computers.

To download a Web page, a user must either input the page's address, referred to in the art as the uniform resource locator or simply URL, or the user must select the page via a hyperlink from another Web page. Stated differently, a Web page may list many other Web pages that happen to be related to it, with the listings referred to as "hyperlinks", and a user can position a mouse-controlled cursor over a hyperlink and click the mouse to cause the user's browser to access the Web page associated with the selected hyperlink.

Unfortunately, it can be confusing and frustrating for two computer users who are communicating with each other via telephone (or some other means) to coordinate the desired Web page rendezvous. This is in part because, to download a Web page, a large amount of data must ordinarily be transferred at rates that can vary, computer to computer, potentially resulting in idle periods for one user as the other user completes a download. Furthermore, a user's verbal identification of a particular hyperlink on which the user desires another user to "click" can be unclear and ambiguous. As recognized by the present invention, however, it is possible to provide a system and method for allowing a first computer user, referred to herein as a "pilot", to cause the browsers of other computer users, referred to herein as "passengers", to display Web pages as desired by the pilot, without requiring interaction from the passengers and without requiring any modifications to the passengers' software.

Accordingly, it is an object of the present invention to provide a system and method for allowing a first computer user to cause the network browser of a second computer user to present Web pages as desired by the first user. Another object of the present invention is to provide a system and method for causing, from a local computer, one or more Web pages to be displayed on remote computers, without requiring remote user interaction. Still another object of the present invention is to provide an easy-to-use, cost-effective system and method for remotely causing a passenger computer Web browser to display Web pages selected by a pilot computer, without requiring software changes to the passenger computer, other than the temporary loading of an applet. Yet another object of the present invention is to provide a system and method for causing, from a local computer, one or more Web pages to be displayed on remote computers, while presenting a status of the remote computer displays to the user of the local computer.

SUMMARY OF THE INVENTION

A computer program device includes a computer program storage device that is readable by a digital processing system and a program means on the program storage device. As intended by the present invention, the program device is realized in a critical machine component that causes the digital processing system to perform method steps to enable a pilot computer to direct the browser of a passenger computer. Stated differently, a machine component establishes a computer program product for performing method steps for enabling a first computer to cause a second computer to display a preselected page from a computer network by transmitting, from the first computer to a control site in the computer network, a request for the predetermined page.

As disclosed in detail below, the present method steps include retrieving the predetermined page at the control site, and then, if the predetermined page includes pointers to other pages in the network, encoding the pointers to thereby render a first page wherein the pointers, when selected by a computer user viewing the page, direct the user's computer to the control site. Also, the pointers are disabled to thereby render a second page. Per the present invention, the first page is transmitted to the first computer, and the second page is transmitted to the second computer.

In a preferred embodiment, if the first computer has accessed a secondary page, the second computer is caused to display the secondary page. In a particular embodiment, in response to the second computer transmitting a valid code to the control site, an active control, such as an applet, is downloaded from the control site to the second computer. The active control is used in executing the transmitting and displaying steps set forth above.

As intended by the preferred embodiment, if the first computer selects, on the first page, a pointer associated with a hyperlink site, the hyperlink site is defined to be the predetermined page. The above encoding and transmitting steps are then repeated. Desirably, the status of the second computer is reported to the first computer. Also, in response to the entry of data by the first computer in connection with the first page, the data can be electronically combined with the first page for simultaneous display thereof by the first computer.

The computer program product is also disclosed in combination with the digital processing apparatus, and in further combination with the computer network.

In another aspect, a computer-implemented method is disclosed for allowing a pilot computer to cause a passenger computer, which includes a passenger Web browser, to display a predetermined Web page. The method includes transmitting, at the pilot computer, the uniform resource, locator (URL) of the predetermined page to a control site. The control site is a member of the Web, such that the control site can retrieve the predetermined page. Then, at the passenger computer, a code is transmitted to the control site and, if the code is valid, an active control is received from the control site. Next, the active control cooperates with the passenger Web browser to download the predetermined Web page from the control site.

In still another aspect, a system is disclosed for allowing a pilot computer to cause a passenger computer including a passenger Web browser to display a predetermined Web page. The system includes, at the pilot computer, logic means for transmitting the uniform resource locator (URL) of the predetermined page to a control site, wherein the control site is a member of the Web. At the control site, logic means are provided for retrieving the predetermined page, and at the passenger computer logic means are provided for transmitting a code to the control site. Moreover, at the control site logic means determine whether the code is valid, and if so, logic means transmit in response thereto an active control to the passenger computer. Additionally, logic means cause the active control to cooperate with the passenger Web browser to download the predetermined Web page from the control site.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
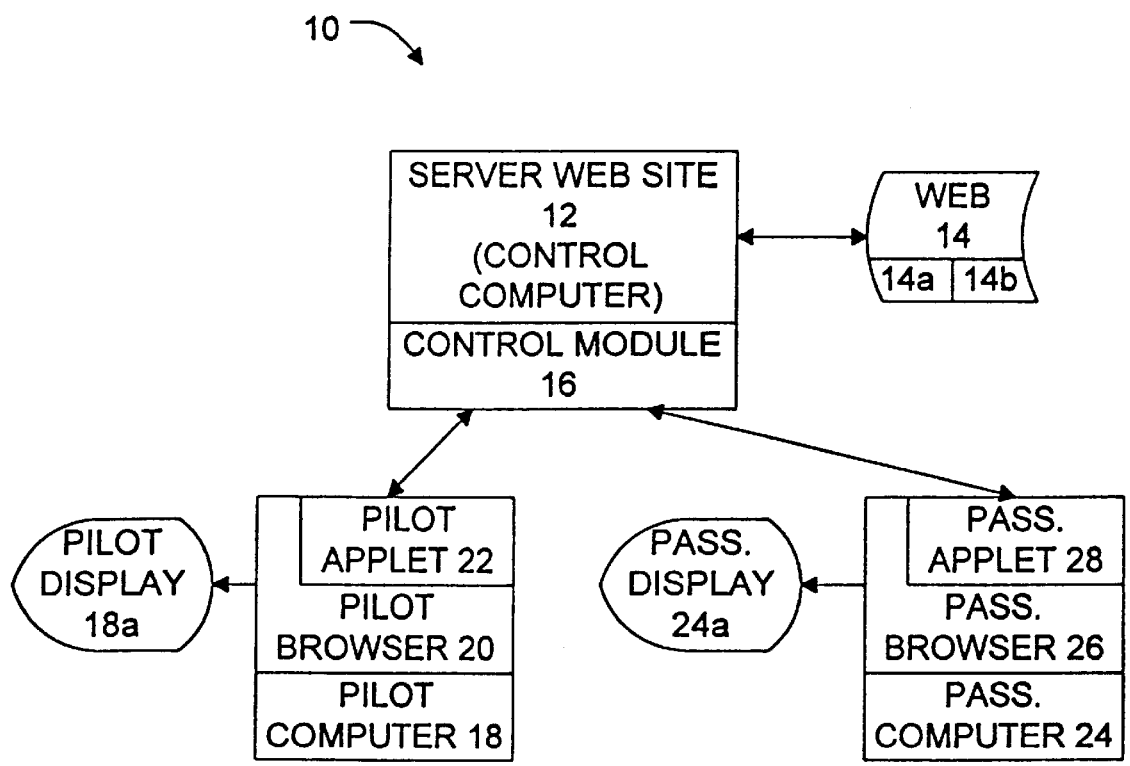
FIG. 1 is a functional block diagram of the present invention.

Referring initially to FIG. 1, a system is shown, generally designated 10, which includes a server computer, hereinafter referred to as a "control computer" 12, which is part of a computer network. In the preferred embodiment, the control computer 12 is part of the computer network 14 referred to as the World Wide Web ("Web"). As is well known, the Web 14 includes a plurality of sites, colloquially referred to as Web pages 14a, 14b, etc. Those skilled in the art will recognize that the control computer 12 can access the pages 14a, 14b of the Web 14 by well-known means.

As discussed further below, the control computer 12 includes a control module 16 which enables a first computer, referred to herein as a "pilot" computer, to control the network navigating systems (referred to herein as "Web browsers") of one or more second computers, referred to here as "passenger computers". Accordingly, FIG. 1 shows that a pilot computer 18 has a pilot Web browser 20, and associated with the pilot Web browser 20 is a pilot active control, preferably a small application program colloquially referred to as an "applet" 22. The pilot applet 22 can cause the pilot Web browser 20 to communicate with the control module 16 via a computer network, e.g., the internet 23 shown. Similarly, FIG. 1 shows one or more passenger computers (only a single passenger computer 24 shown in FIG. 1 for clarity), and the passenger computer 24 has a passenger Web browser 26. A passenger active control, preferably a passenger applet 28, is associated with the passenger browser 26 to cause the passenger browser 26 to communicate with the control module 16 via the internet 23. The pilot computer 18 and passenger computer 24 can be any suitable user computer, e.g., a personal computer or laptop computer, each having a respective video monitor or flat panel display 18a, 24a for presenting Web pages 14a, 14b thereon. Also, the browsers 20, 26 can advantageously be commercial browsers, such as are made by Netscape and Microsoft Corp.

Figure 2:
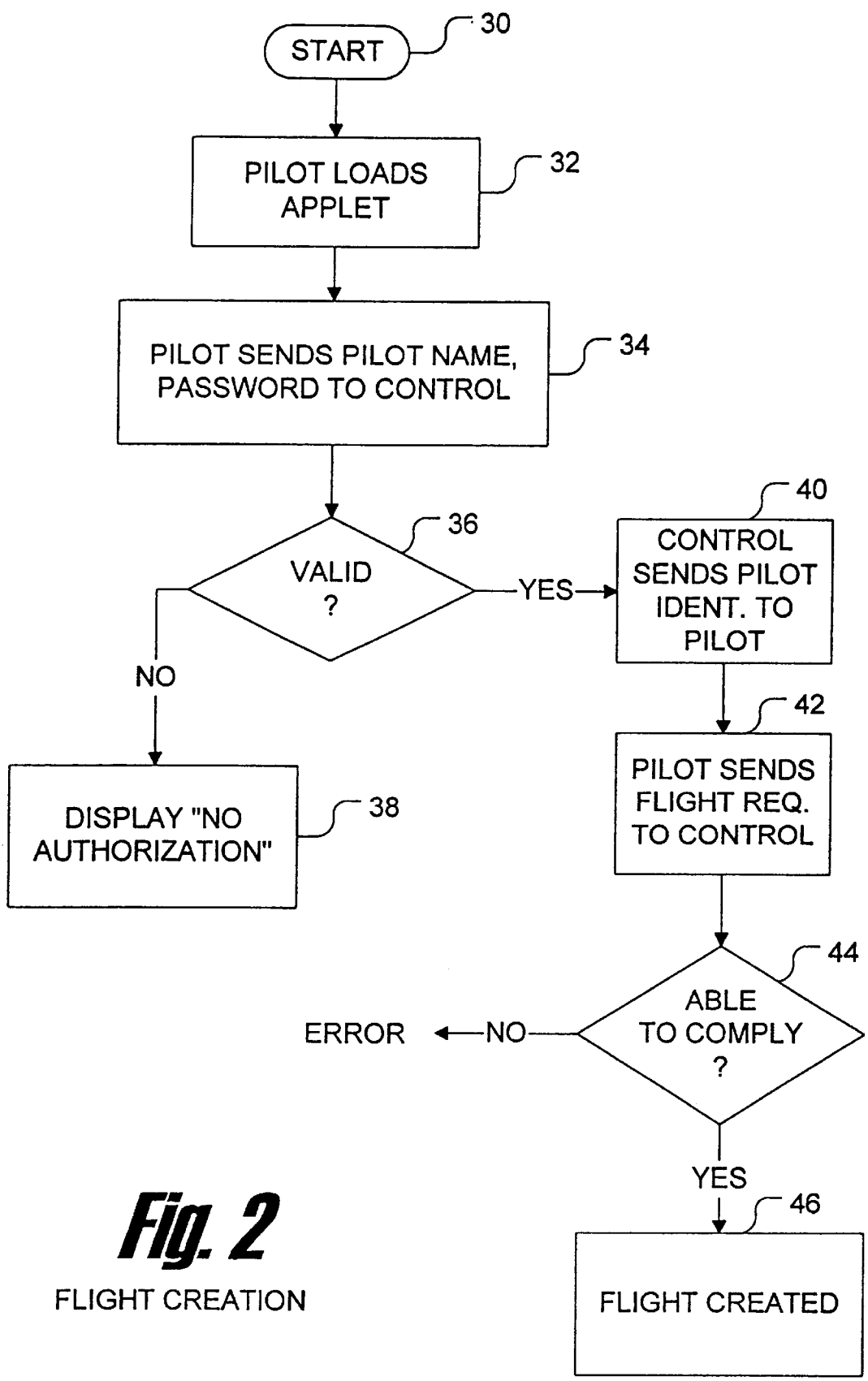
FIG. 2 is a flow chart showing the flight creation process of the present invention.
Figure 3:
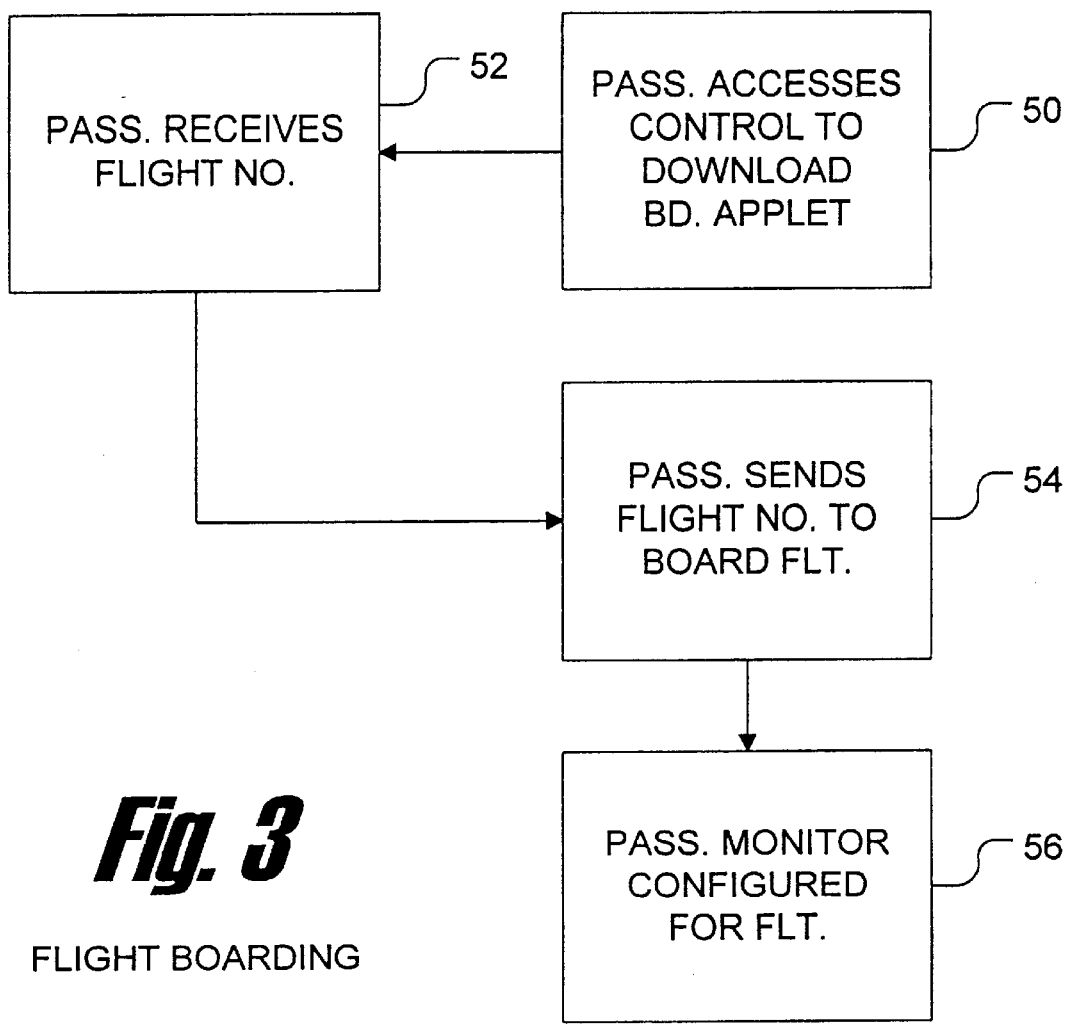
FIG. 3 is a flow chart showing the flight boarding process.
Figure 5:
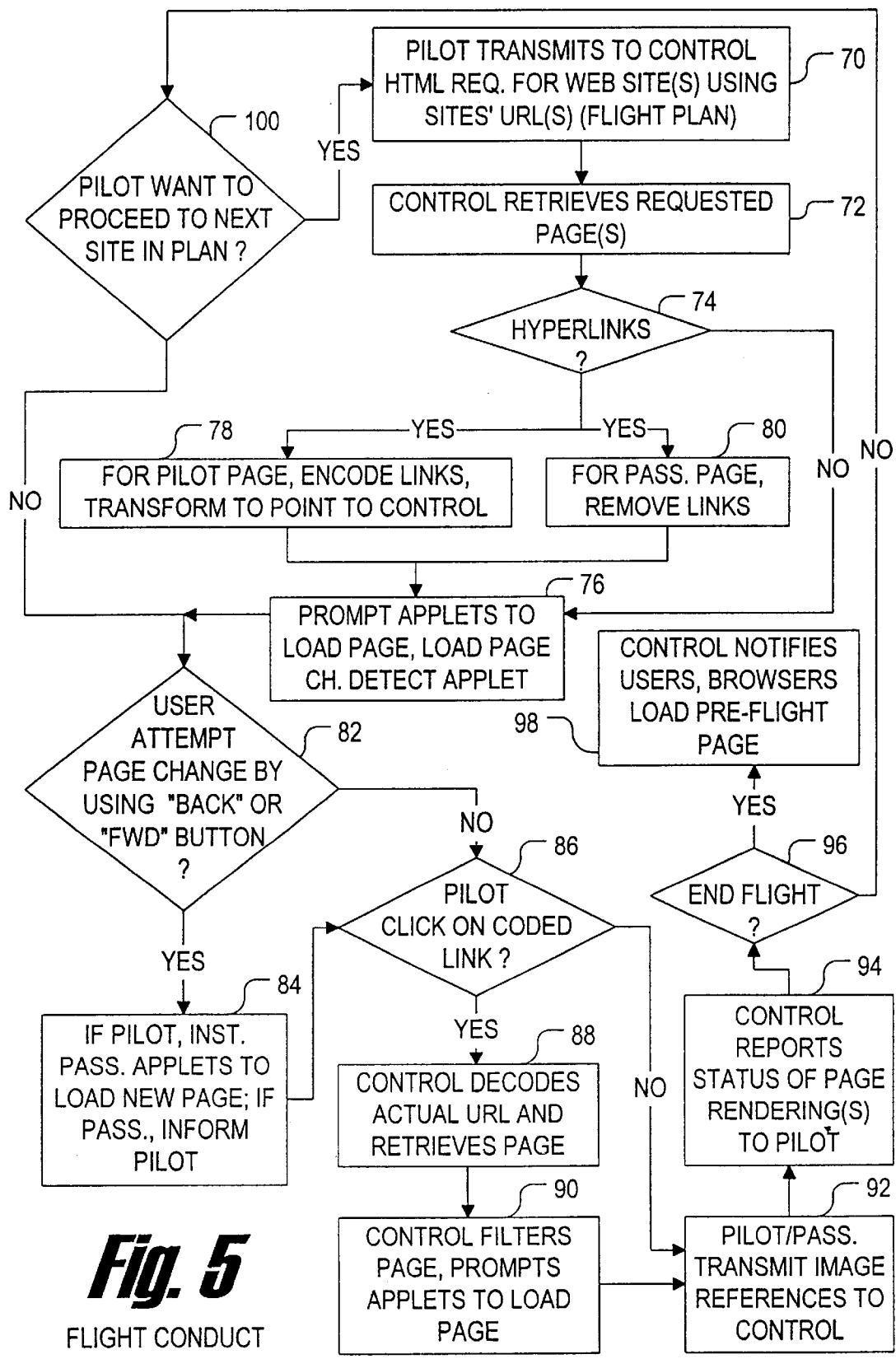
FIG. 5 is a flow chart showing the flight conduct process.

FIGS. 2, 3, and 5 illustrate the structure of the control module 16 and applets 22, 28 of the present invention as embodied in computer program software. Those skilled in the art will appreciate that the Figures illustrate the structures of logic elements, such as computer program code elements or logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in the Figures.

These instructions may reside on a program storage device including a data storage medium, such as a computer diskette. Alternatively, such media can also be found in semiconductor devices, on magnetic tape, on optical disks, on a DASD array, on a conventional hard disk drive, on electronic read-only memory or on electronic random access memory, or other appropriate data storage device. In an illustrative embodiment of the invention, the logic means are computer-executable instructions that are written in the Java language.

FIG. 2 shows the initialization process of the present invention. As can be understood from the above discussion, the present invention uses airline terminology for ease of illustration and understanding. For example, a Web site tour through which the user of the pilot computer 18 plans to guide the passenger computer 24 is referred to as a "flight". Accordingly, the initialization process shown in FIG. 2 can be considered a flight creation process which commences at start state 30 and moves to block 32, wherein the pilot computer 18 loads the pilot applet 22. Preferably, the pilot applet 22 includes a flight creation applet. In the preferred embodiment, the pilot applet 22 is downloaded from the control module 16. The flight creation applet enables the pilot computer to transmit the user name and password of the user of the pilot computer 18. At decision diamond 36, the control module 16 determines whether the user name and password are valid, and if not causes the pilot computer 18 to display a message at block 38 indicating that the pilot computer 18 lacks the necessary authorization to create a flight.

On the other hand, if the password is valid the control computer proceeds to block 40 to send a pilot identification code, colloquially referred to as a "cookie", to the pilot computer 18. With this pilot identification code, the flight creation applet permits the pilot computer 18, at block 42, to transmit a flight request to the control module 16 using HTTP protocol. This flight request lists one or more Web pages to which the user of the pilot computer 18 wishes to guide the passenger computer(s) 24. Also, the flight request can include other data, such as the identifications of the intended passenger computers.

Proceeding to decision diamond 44, the logic of the system 10 next determines whether the control module 16 is able to comply with the requested flight. If not, an error message is returned, but otherwise the control module 16 creates the requested flight at block 46 by generating a flight number for the flight and recording information pertinent thereto, e.g., the desired Web pages.

It is next necessary that the passenger computer 24 relinquish control of the passenger browser 26 to the pilot computer 18 by "boarding" the flight thus created. A passenger can board a flight at any time during the flight. Accordingly, referring now to FIG. 3, at block 50, using its Web browser 26 the passenger computer 24 accesses the control module 16 using the appropriate URL to download a boarding applet therefrom. Then, at block 52 the user of the pilot computer 18 communicates to the passenger computer 24 user, via voice, e-mail, or other means, the flight number of the flight created at block 46 of FIG. 2. Using the boarding applet, at block 54 the user of the passenger computer 24 sends the flight number to the control module 16, and in response, assuming the flight number sent by the passenger computer 24 is valid, the control module 16 causes the boarding applet to download a passenger applet to the passenger computer 24. The passenger computer can also send its identification to the control module 16. As indicated at block 56, when the passenger applet is downloaded, the display 24a of the passenger computer 24 is configured for the flight as shown in FIG. 4.

Figure 4:
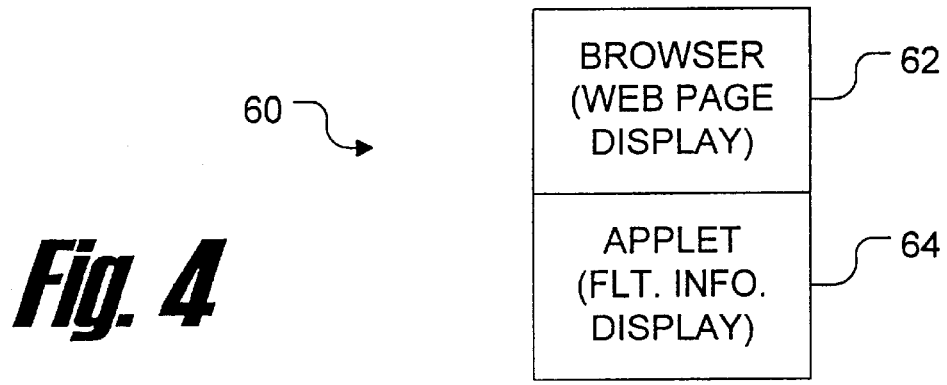
FIG. 4 is a schematic diagram showing a user display.

FIG. 4 shows that in the preferred configuration of the displays 18a, 24a of the computers 18, 24, the displays 18a, 24a are divided in two windows. On the top window is the computer's respective browser 20, 26 display, which presents, among other things, Web pages. In contrast, as shown in FIG. 4 the bottom window presents information pertaining to the flight applets disclosed below. In other words, the bottom window of each displays 18a, 24a presents information pertaining to the current flight.

Now referring to FIG. 5, the flight conduct method steps can be seen. It is to be understood that while FIG. 5 is depicted in flow chart format for ease of disclosure, some of the processes shown in FIG. 5 can be continuously undertaken in parallel with each other.

Commencing at block 70, the pilot computer 18 transmits to the control module 16 a request for a predetermined Web page. It is to be understood that the request can be in the form of an instruction to execute the flight plan developed above, which plan, it will be recalled, includes the URLs of the Web pages to be accessed. In response, at block 72 the control module 16 retrieves the requested Web page.

Next, at decision diamond 74 the control module 16 determines whether the requested information contains any hyperlinks to other Web sites. When the requested information is an HTML-formatted Web page, the test at decision diamond 74 is positive, but otherwise it is negative. Thus, if the information requested at block 72 is not a Web page, i.e., if it is a non-HTML image, postscript, etc., the logic moves to block 76, wherein the control module 16 prompts the applets 22, 28 to cause the browsers 20, 26 to download the requested information into the respective computers 18, 24. Also at block 76, a page change detect applet is downloaded along with the information.

On the other hand, if it is determined at decision diamond 74 that the requested information is a Web page and that consequently it is likely to contain hyperlinks to other Web sites, the logic proceeds to blocks 78 and 80. At block 78, the control module renders a pilot version of the requested Web page by filtering the page as follows. All of the hyperlinks of the requested Web page are encoded to point back to the control computer 12. Stated differently, after encoding the hyperlinks of the requested Web page, as presented to the user of the pilot computer 18, are in all substantial respects identical to the unencoded hyperlinks, except that when selected, the hyperlinks point not to their associated Web pages, but rather to the control computer 12.

In contrast, at block 80 a passenger version of the requested Web page is rendered by sanitizing the requested Web page by removing or otherwise disabling all of the hyperlinks of the requested Web page. Then, at block 76 the filtered and sanitized versions of the requested Web page are sent to the pilot and passenger computers 18, 24, respectively.

From block 76, the logic moves to decision diamond 82, to determine, using the page change detect applets, whether any user (pilot or passenger) has attempted to change that user's presented Web page. For example, a user might select the "BACKWARD" or "FORWARD" icon that most Web browsers feature, to retrieve other previously accessed Web pages.

If a page change detect applet detects a selection of an alternate Web page on the part of the pilot computer 18, the applet communicates the page change to the control module 16, which in turn instructs the passenger applet 28 to cause the passenger browser 26 to display the alternate Web page. Also, in the event that the pilot computer 18 has designated that a passenger computer assume a co-pilot computer function as discussed below, the page change detect applet prevents the applet of the co-pilot computer, after changing its page, from repeating the page change order to the other user computers (pilot and passenger), to thereby avoid endless loops of page change orders. In contrast, if a page change detect applet detects a selection of an alternate Web page on the part of the passenger computer 24, the applet communicates the change to the control module 16, and the control module 16 causes the lower window of the pilot display 18a to display a message indicating that the passenger computer 24 has selected another Web page for display.

Recall that the Web page presented to the user of the pilot computer 18 presents encoded versions of the hyperlinks of the selected Web page. Moving to decision diamond 86 from block 84 or from decision diamond 82 if the test there was negative, it is determined whether the user of the pilot computer 18 has selected one of the encoded hyperlinks. If the pilot has clicked on a hyperlink, the logic moves to block 88, wherein the control module 16 receives the hyperlink and decodes it to identify the associated Web page. The control computer 12 then retrieves the associated Web page.

Next, at block 90, the control module 16 filters and sanitizes the retrieved page as disclosed previously in reference to blocks 78 and 80, and prompts the passengers' applets to download the processed pages as described above in relation to block 76. It is to be understood that when the user of the pilot computer 18 has selected (i.e., has "clicked on") a hyperlink, the pilot browser 20 immediately loads the filtered page from the control module 16, without awaiting instructions to do so from the pilot applet 24. From block 90, or from decision diamond 86 if the pilot did not click on a hyperlink, the logic moves to block 92.

At block 92, the pilot and passenger applets 22, 28 transmit messages to the control module 16 that are representative of the images presented on the displays 18a, 24a. If desired, at block 94 the passenger computer 24 data can be relayed to the pilot computer 18, to enable the pilot computer 18 to monitor the status of the presentation on the passenger display 24a. In any case, it may now be understood that data pertaining to the conduct of the flight is stored for future retrieval and reuse.

Moving next to decision diamond 96, the logic determines whether the pilot computer 18 has signified a desire to end the current flight. If so, the logic moves to block 98, wherein the control module 16 notifies all users that the flight has been ended, the applets 22, 28 relinquish control of the browsers 20, 26 after causing the displays 18a, 24a to present the respective screens that were presented before the flight commenced.

If the flight hasn't ended, however, the logic moves from decision diamond 96 to decision diamond 100, wherein it is determined whether the pilot computer 18 desires to proceed to the next Web site in the flight plan. If so, the logic moves to block 70, but otherwise loops back to decision diamond 82 to proceed as described above.

It may now be appreciated that by using small, downloaded applets, the above flight conduct, i.e., the transfer of control of the passenger browser 26 to the pilot computer 18, is accomplished without requiring the pre-loading of software that is specific to the system 10 at the pilot computer 18 or passenger computer 24. Furthermore, by using standard HTTP protocol, the transfer of control of the passenger browser 26 to the pilot computer 18 is accomplished without requiring special proxies, firewall additions, or exceptions at either the pilot computer 18 or passenger computer 24.

Figure 6:
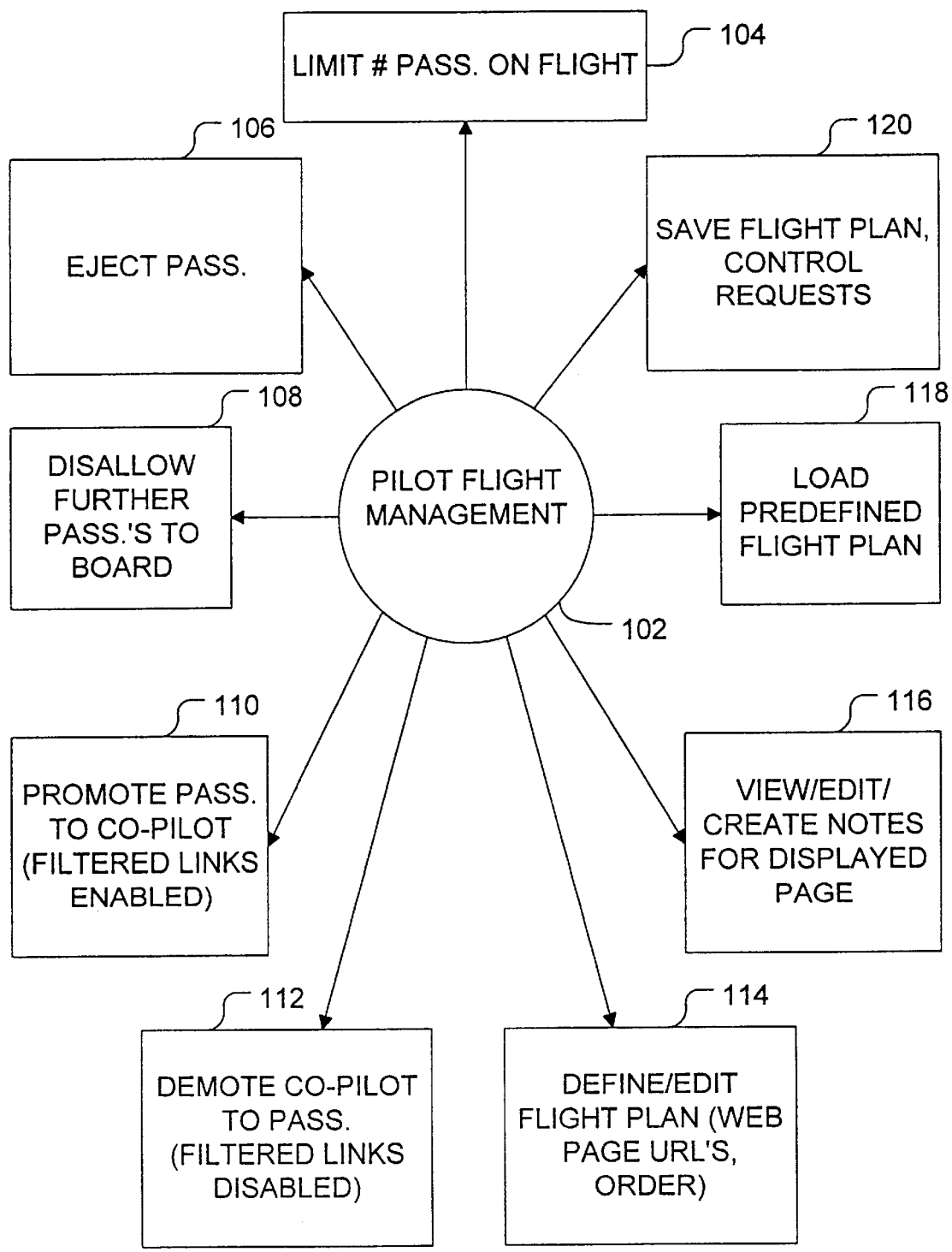
FIG. 6 is a state diagram showing the flight management process.

Now referring to FIG. 6, the flight management logic of the present invention is shown. It is to be understood that the pilot computer 18 assumes the pilot flight management state 102 concurrently with the operations undertaken above in reference to FIG. 5. It is to be further understood that the flight management steps shown in FIG. 6 can be instigated by an HTML request from the pilot computer 18 to the control computer 16 to undertake the various flight management tasks shown.

As shown in FIG. 6, the logic can move to a state 104 in which the control module 16 is instructed to limit the number of passengers permitted on a flight to a predetermined number. Or, the logic can move to state 106 to eject a passenger during flight, or to state 108 to disallow preselected passengers from boarding the flight. Additionally, the logic can move to state 110 to promote a passenger computer to co-pilot status. When in co-pilot status, a user is presented with the filtered version of the Web page instead of the sanitized version, but otherwise assumes no other pilot functions. Thereby, a co-pilot computer can be allowed limited control to "click" on hyperlinks, which clicks are then processed as they are for the pilot computer 18.

Moreover, the logic can move to state 112 to demote a co-pilot user to passenger status. Or, at state 114 the pilot computer 18 can define and edit flight plans, including ordering the sequence in which it is desired that a flight retrieve preselected Web pages having associated URLs. Still further, at state 116 the pilot computer 18 can create notes on the filtered Web page presented on the pilot display 18a, and edit and review notes that might have been previously made. And, at state 118 the pilot computer 18 can load a predefined flight plan such that the pilot and passenger computers automatically are "flown" to various predetermined Web sites, and save the plan at state 120. Also, as stated above requests and other communications made by the users of the system 10 to the control module 16 are saved for analysis off-line.

While the particular BROWSER CONTROLLER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer program device comprising:
   a computer program storage device readable by a digital processing system; and
   a program means on the program storage device and including instructions executable by the digital processing system for performing method steps for enabling a first computer to cause at least one second computer to display a predetermined page from a computer network by transmitting, from the first computer to a control site in the computer network, a request for the predetermined page, the method steps comprising:
   (a) retrieving the predetermined page;
   (b) if the predetermined page includes pointers to other pages in the network, (1) encoding the pointers to thereby render a first page wherein the pointers, when selected by a computer user viewing the page, direct the user's computer to the control site, and (2) disabling the pointers from the predetermined page to thereby render a second page;
   (c) transmitting the first page to the first computer; and
   (d) transmitting the second page to the second computer.

2. The computer program device of claim 1, wherein the method steps further comprise:
   (e) if the first computer has accessed a secondary page, causing the second computer to display the secondary page.

3. The computer program device of claim 2, wherein the method steps further comprise:
   in response to the second computer transmitting a valid code to the control site, downloading from the control site to the second computer an active control; and
   executing steps (d) and (e) by instructing the active control to cause the second page to be downloaded.

4. The computer program device of claim 3, wherein the method steps further comprise;
   if the first computer selects, on the first page, a pointer associated with a hyperlink site, defining the hyperlink site to be the predetermined page and then repeating steps (a)–(d).

5. The computer program device of claim 4, wherein the method steps further comprise:
   reporting to the first computer the status of the second computer displaying the second page.

6. The computer program device of claim 5, wherein the method steps further comprise:
   in response to the entry of data by the first computer in connection with the first page, electronically combining the data with the first page for simultaneous display thereof.

7. The computer program device of claim 6, in combination with the digital processing apparatus.

8. The combination of claim 7, in further combination with the computer network.

9. A method for enabling a first computer to cause at least one second computer to display a predetermined page from a computer network, the method comprising the steps of:

receiving a request for the predetermined page;

retrieving the predetermined page;

recognizing in the predetermined page pointers to other pages in the network;

rendering a first page from the predetermined page by encoding the recognized pointers to point to a control site;

rendering a second page from the predetermined page by disabling the recognized pointers;

transmitting the first page to the first computer; and transmitting the second page to the second computer.

10. The method of claim 8, further comprising the steps of:

receiving an encoded recognized pointer from the first computer, the encoded recognized pointer identifying a secondary page in the network to which the recognized pointer corresponding to the received pointer pointed in the predetermined page;

retrieving the secondary page;

recognizing in the secondary page pointers to other pages in the network;

rendering a third page from the secondary page by encoding the pointers recognized in the secondary page to point to the control site;

rendering a fourth page from the secondary page by disabling the pointers recognized in the secondary page;

transmitting the third page to the first computer; and transmitting the fourth page to the second computer.

* * * * *